United States Patent [19]

Knödler et al.

[11] 3,940,314

[45] Feb. 24, 1976

[54] NUCLEAR REACTOR FUEL ELEMENT

[75] Inventors: Diethelm Knödler; Hans Kropfl, both of Erlangen; Peter Raú, Mittelehrenbach; Theodor Wittmann, Sassanfahrt, all of Germany

[73] Assignee: Siemens Aktiengesellschaft, Munich, Germany

[22] Filed: Mar. 2, 1972

[21] Appl. No.: 231,322

[30] Foreign Application Priority Data

Mar. 10, 1971 Germany............................ 2111349

[52] U.S. Cl................................. 176/78; 176/91 R
[51] Int. Cl................................................. G21c 3/30
[58] Field of Search...................... 176/76, 78, 91 R

[56] References Cited
UNITED STATES PATENTS

| | | | |
|---|---|---|---|
| 3,284,315 | 11/1966 | Thome | 176/91 R |
| 3,466,226 | 9/1969 | Lass | 176/68 |
| 3,736,227 | 5/1973 | Nakazato | 176/78 |

Primary Examiner—Stephen J. Lechert, Jr.
Attorney, Agent, or Firm—Kenyon & Kenyon Reilly Carr & Chapin

[57] ABSTRACT

A nuclear reactor fuel element comprised of a plurality of fuel rods disposed in a plurality of spacers in which the tubular casing for each fuel rod is designed without regard to the mechanical stress produced by the spacers and has a reinforced wall thickness adjacent to the spacers which is thicker than the wall thickness of the tubular casing in other areas not adjacent to the spacers. The spacers are arranged in a circular mesh with a center support rod.

10 Claims, 6 Drawing Figures

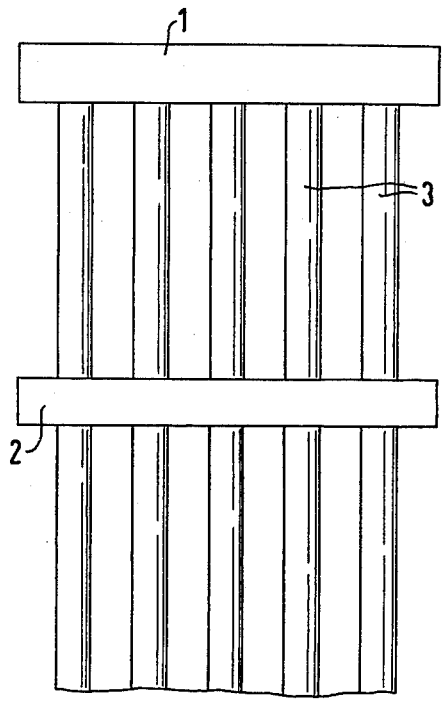
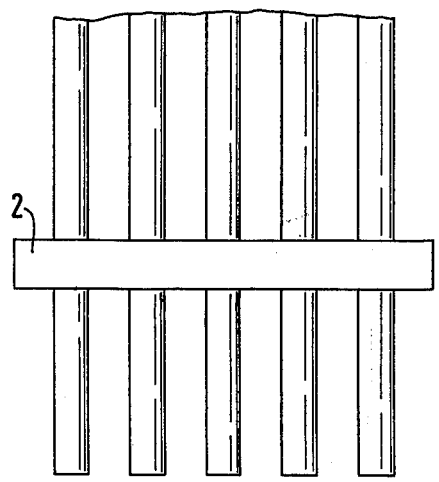
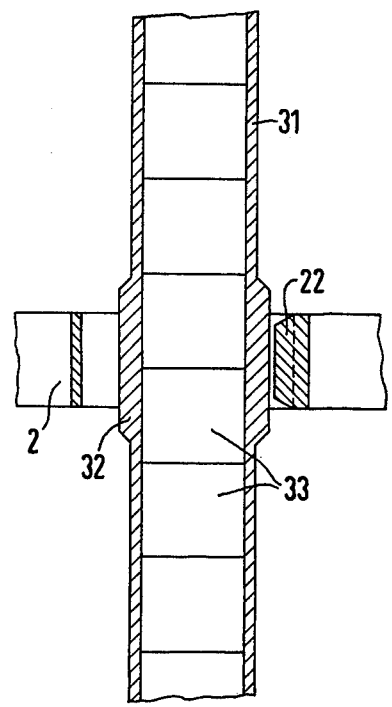
Fig.1
Fig.2

NUCLEAR REACTOR FUEL ELEMENT

BACKGROUND OF THE INVENTION

1. Field of the Invention

This invention relates to a nuclear reactor fuel element which consists of a multiplicity of fuel rods, disposed or held in spaced relation by spacers arranged in several planes, and fastened to at least one support plate. Each fuel rod has a tubular casing which contains the nuclear fuel, for instance, in the form of pellets. Next to the fuel rods, these spacers constitute the most essential structural units within the fuel elements because by means of these spacers the fuel rods are maintained in a predetermined spacial relation. This is necessary so that over the entire life of the nuclear reactor, a completely uniform cooling of the fuel rods and the fuel elements is achieved by the reactor coolant. The reactor coolant may be either a gas or a liquid.

2. Description of the Prior Art

It is known that spacers automatically interact with the fuel rods and the latter, in turn, interact with the tubular casings. For this reason, the type of material and the wall thicknesses of the parts in contact with each other must be matched to each other, taking into consideration the mechanical forces which may occur. Thus, the wall thicknesses of the tubular casing should be so large that mechanical damage to the tubular casings cannot occur. On the other hand, the total amount of structural material within the active zones of the reactor core should be kept as low as possible for reasons of neutron efficiency. In addition, the problems of heat removal and creep at the operating temperature of the reactor are important considerations.

SUMMARY OF THE INVENTION

The object of this invention is to find the optimum fuel element design which meets the foregoing requirements. According to the invention, this is achieved by designing the wall thickness of the tubular casings for the fuel rods without regard to the mechanical stress produced by the spacers and enlarging it according to the height of the spacers. Using this design criteria, it is possible to achieve the optimum design of the wall thickness of the tubular casing only on the basis of the operating conditions of the nuclear reactor, such as pressure, temperature, operational cycles and fuel expansion, as a function of fission gas pressure, swelling of the fuel, creep behavior of the material, etc. The mechanical stresses produced by the spacers are only taken into consideration at the contact points between the spacers and the tubular casings at the height of the spacers. At these points, the wall thickness of the tubular casings is larger. By using fuel elements of this design, instead of conventional fuel elements, substantially less tubular-casing material, such as Zircaloy, needs to be built into the nuclear reactor. As a result, losses caused by this material through neutron absorption can be reduced.

This design criteria applies to practically all types of nuclear reactors. To illustrate this further, a fuel element for a heavy-water cooled nuclear reactor will be described in more detail. Such a fuel element has a circular cross section and is used in the reactor core within so-called separation tubes. The idea of the invention shown here can, of course, also be applied to fuel elements of other cross sections and geometry. So-called guide ducts are sometimes attached to the tubular casings of the fuel rods at the height of the spacers. Attachment of such guide ducts by means of soldering or welding always involves a heat treatment, which may in some cases bring with it the danger of premature defects in the material of the tubular casing due to metallurgical changes. The present invention provides a way of avoiding such defects and other influences on the structure of the tubular casings when such guide ducts are attached. The spacers can be brought into contact directly at the fuel rods, i.e., at their reinforced points, which facilitates a relatively simple design. Likewise, mechanical stress on the tubular casings when the fuel rods are inserted into or moved in the spacers is practically eliminated.

DESCRIPTION OF THE DRAWINGS

FIG. 1 is a schematic view of a fuel element, having a plurality of fuel rods.

FIG. 2 is a longitudinal cross-sectional view of a portion of FIG. 1.

DETAILED DESCRIPTION

Figure 3:
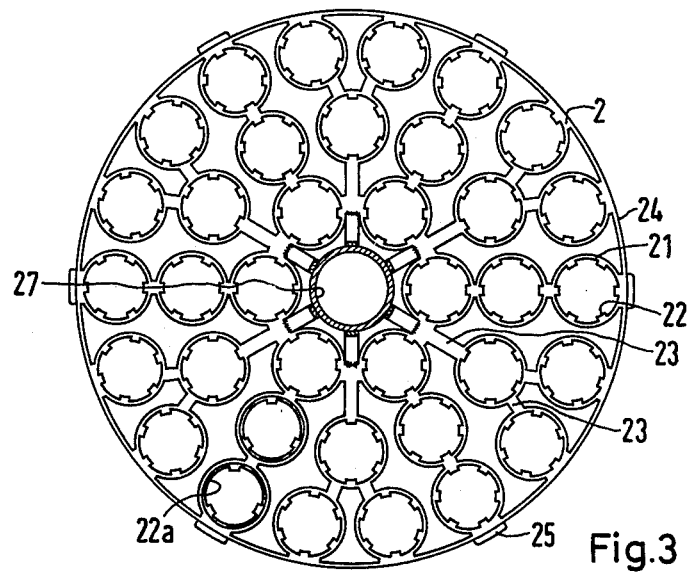
FIG. 3 shows one embodiment of spacer design for use in conjunction with fuel rods.

FIG. 1 shows schematically the construction of a fuel element with a plurality of fuel rods 3, which are held by at least one end in a rod support plate 1 and are maintained in a predetermined spacial relationship by a plurality of spacers 2 arranged in several planes to form grids. FIG. 2 shows a longitudinal cross-sectional view through a fuel rod 3 of FIG. 1 at the height of a spacer 2. The fuel rod 3 consists essentially of a tubular casing 30 enclosing the nuclear fuel 33 in its interior. The latter is mainly in the form of pellets. The wall thickness 32 of the segment of the tubular casing 30 adjacent to each spacer 2 is thicker than the wall thickness 31 in the areas not adjacent to the spacer 2. The projection 22 of the spacer 2 makes contact with the tubular casing 30, without the danger of damage to the latter. The reinforcement of the wall thickness 32 is of a magnitude which does not influence heat removal appreciably. Such wall thickness 32 compensates for the higher stress at the point of contact of the tubular casing with the spacer 2 due to the force subdivision by the spacer 2, and also, to a certain degree, for the material wear caused by it. The latter occurs frequently only until full contact with the projection 22 has been made.

There are several possibilities for the manufacture of the reinforcement provided by the wall thickness 32. Such manufacture may be accomplished by plastic deformation over a calibrated mandrel. In the alternative, the tubular casing 30 may be manufactured with a wall thickness that corresponds to that at the spacer 2. The wall sections 31 outside the region of the spacer 2 may be reduced by machining or non-cutting deformation, wherein it is possible to take into initial consideration the change in length which may be caused thereby. Furthermore, the difference between these wall thickness 31 and 32 can also be achieved and adjusted by appropriate design of the rolls of the tube rolling mills. Such processes are within the state of the art and therefore need not be described in detail.

Figure 4:
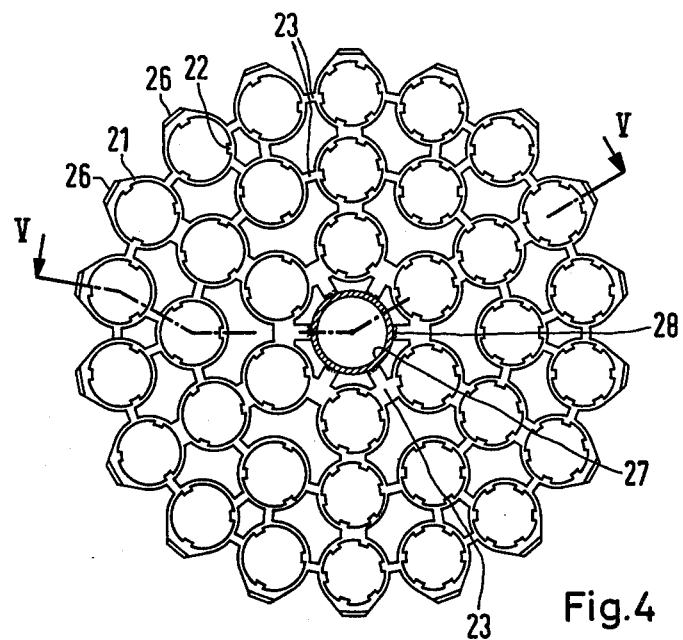
FIG. 4 shows another embodiment of spacer design for use in conjunction with fuel rods.

FIGS. 3, 4, 5 and 6 show spacer designs which are particularly advantageous for use in conjunction with these fuel rods 3. In these embodiments, the entire mesh of spacers 2 are designated by the numeral 21; the plurality of projections in each spacer 2 for making contact with the reinforced wall thickness 32 of the tubular casing 30 of the fuel rods 3 are designated by the numeral 22; and the connecting webs between the spacers 2 are designated by the numeral 23. The mesh shape chosen in these spacer designs is circular, so that a guide duct of practically the same thickness for the coolant may be arranged around each fuel rod 3 and an equalization of the cooling effect over the entire circumference of the fuel rod 3 is thereby achieved. FIGS. 3 and 4 illustrate similar spacer meshes 21. But, the spacers 2 are connected with each other differently to form the overall spacer structure.

Figure 5:
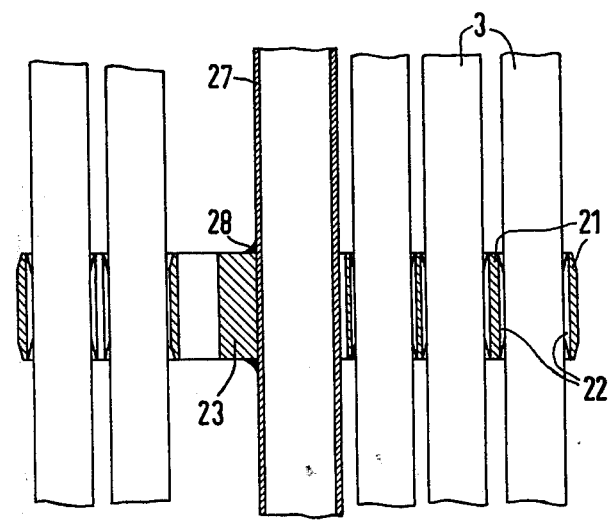
FIG. 5 is a cross-sectional view of FIG. 4 along the line V—V.

In FIG. 3 the projections 22, which form part of the spacers 2, can be replaced by insertable, suitably formed rings 22a, which can be connected with the spacers 2 mechanically or metallurgically and which make contact with the reinforced wall thickness of the tubular casing 30 of the fuel rod 3. This construction provides greater latitude in the selection of materials, a resilient design and, possibly, easier manufacture. FIG. 5 is a cross sectional view through spacer mesh 21 along the line V—V of FIG. 4.

Referring to FIG. 3, this spacer mesh 21 is surrounded by a strap 24 which is provided on its outside circumference with a plurality of pads 25 for making contact with the separating tubes of the nuclear reactor. These spacers 2 are mounted on a support rod 27, which is arranged in the center of mesh 21 in lieu of a fuel rod 3 (shown in FIG. 2). Referring to FIG. 5, this can be accomplished by welds 28. This support rod 27 can, of course, also contain nuclear fuel.

FIG. 4 shows an embodiment of a spacer 2 in which the surrounding strap 24 is omitted. The necessary strength and stability is provided by a different arrangement of the connecting webs 23. The mesh 21 is provided on its outer circumference with outward-pointing pads 26, the function of which corresponds to the function of the pads 25 in FIG. 3.

Figure 6:
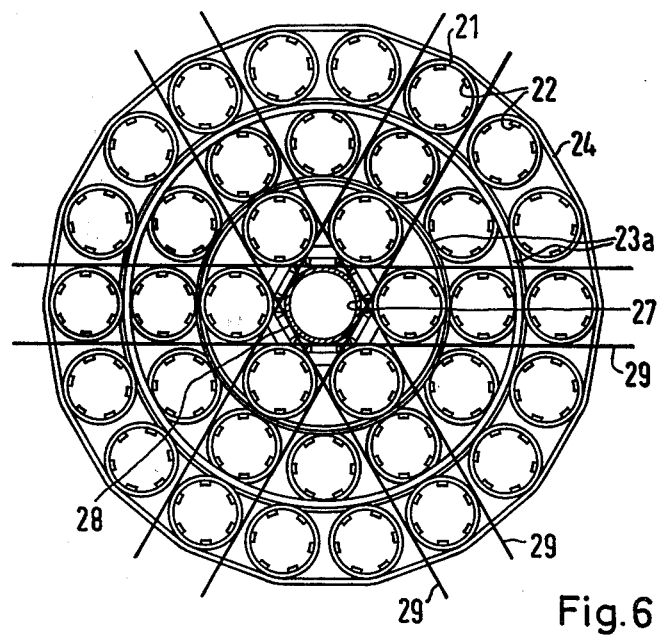
FIG. 6 shows another embodiment of spacer design for use in conjunction with fuel rods.

The spacers 2 shown in FIG. 1 can be fastened at the proper elevation by a manner different from that shown in FIG. 5 by use of additional sheet metal straps 29 above and below the spacers 2 at the central support rod, as is shown in FIGS. 3 and 4; except for the connection of the individual spacers 2 which is made in FIG. 6 by concentric ring straps 23a.

In conclusion, it should be mentioned that the spacers 2 shown in the foregoing embodiments can advantageously be machined from an integral piece. In this manner, the greatest possible dimensional accuracy can be obtained. The manufacturing costs should also be lower than by manufacturing such spacers 2 from individual components, which would have to be appropriately welded or soldered together. Since the method of manufacturing from individual components also raises other problems regarding strength and corrosion resistance, not to mention the complexity of implementation, the method of machining from an integral piece is considered preferable. This latter method includes the spark erosion method and chemical machining.

For mounting the reinforced fuel rods, spacers having resilient contact points could, of course, also be used. In many cases, however, such resilient contact points may be omitted because of the increased stability of the tubular casing 30 in the region of the spacers 2 at these points, which is also advantageous for manufacturing reasons.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. A nuclear reactor fuel element comprising fuel rods having outsides and spacers contacting said outsides and maintaining said rods in spatial relationship; wherein the improvement comprises said rods each comprising a casing having one continuous hollow tubular wall having a length and having at least one tubular section along said length where said wall is of increased thickness, said sections forming said outsides contacted by said spacers and said casings containing nuclear fuel.

2. A nuclear reactor fuel element according to claim 1, wherein said spacers are arranged in a circular mesh and are connected together by webs.

3. A nuclear reactor fuel element according to claim 1, wherein said spacers are arranged in a circular mesh and are connected together by concentric ring straps.

4. A nuclear reactor fuel element according to claim 1, wherein said spacers each have a plurality of projections therein for making contact with the reinforced wall thickness of the tubular casing of the fuel rod.

5. A nuclear reactor fuel element according to claim 1, wherein said spacers each have an insertable ring connected to the spacer for making contact with the reinforced wall thickness of the tubular casing of the fuel rod.

6. A nuclear reactor fuel element according to claim 2, wherein said spacer mesh is provided on its outer circumference with outwardly pointing pads.

7. A nuclear reactor fuel element according to claim 2, wherein the spacer mesh is surrounded by a strap and the strap is provided on its outer circumference with a plurality of pads.

8. A nuclear reactor fuel element according to claim 2, wherein the spacers are mounted on a support rod which is arranged in the center of the mesh.

9. A nuclear fuel element according to claim 8, wherein the spacers are mounted on support rods by means of welds.

10. A nuclear fuel element according to claim 8, wherein the spacers are mounted on a support rod in the center of the mesh by use of additional sheet metal straps above and below the spacers at the support rod.

* * * * *